(12) United States Patent
Tinaphong

(10) Patent No.: US 9,957,006 B2
(45) Date of Patent: May 1, 2018

(54) STABILITY ATTACHMENT FOR A TWO-WHEELED, SELF-BALANCING, PERSONAL TRANSPORTATION VEHICLE

(71) Applicant: VOXX International Corporation, Hauppauge, NY (US)

(72) Inventor: Prapan Paul Tinaphong, Carmel, IN (US)

(73) Assignee: VOXX International Corporation, Hauppauge, NY (US)

( * ) Notice: Subject to any disclaimer, the term of this patent is extended or adjusted under 35 U.S.C. 154(b) by 42 days.

(21) Appl. No.: 15/358,338

(22) Filed: Nov. 22, 2016

(65) Prior Publication Data

US 2017/0144718 A1 May 25, 2017

Related U.S. Application Data

(60) Provisional application No. 62/266,229, filed on Dec. 11, 2015, provisional application No. 62/259,714, filed on Nov. 25, 2015.

(51) Int. Cl.
  *B62H 1/12* (2006.01)
  *B62K 11/00* (2006.01)
  *B62H 1/06* (2006.01)

(52) U.S. Cl.
  CPC ............... *B62H 1/12* (2013.01); *B62H 1/06* (2013.01); *B62K 11/007* (2016.11)

(58) Field of Classification Search
  CPC ........... B62H 1/12; B62H 1/06; B62K 11/007
  See application file for complete search history.

(56) References Cited

U.S. PATENT DOCUMENTS

| 4,746,132 A | 5/1988 | Eagan .................. 280/1.13 |
| 8,240,407 B2 * | 8/2012 | Takenaka ............ B60B 19/003 180/10 |
| 8,738,278 B2 | 5/2014 | Chen .................... 701/124 |
| 9,126,497 B2 | 9/2015 | Heinzmann et al. |

(Continued)

OTHER PUBLICATIONS

Polgal, "Hoverboard Fair", Sep. 5, 2015 (Sep. 5, 2015), Retrieved from the Internet: URL: https://www.youtube.com/watch?v=oFhZ3H1cywE [retrieved on Nov. 9, 2015], the whole document. (last accessed on Feb. 24, 2017).

(Continued)

*Primary Examiner* — Kevin Hurley
*Assistant Examiner* — Marlon A Arce
(74) *Attorney, Agent, or Firm* — Bodner & O'Rourke, LLP; Gerald T. Bodner; Christian P. Bodner

(57) ABSTRACT

A stability attachment for a personal transportation vehicle includes a frame, a clamp mechanism and a pair of training wheels. The frame includes a first support arm and a second support arm. The first and second support arms are interconnected by the clamp mechanism. Each of the training wheels is situated on opposite sides of the frame and vertically adjustable thereon. The frame is selectively mounted to the main body of the personal transportation vehicle on which the operator stands by the clamp mechanism. The clamp mechanism is adjustable so that the stability attachment can be mounted to personal transportation vehicles of various sizes. Each of the support arms includes at least two telescoping members so that the overall length of the support arm can be adjusted.

22 Claims, 11 Drawing Sheets

(56) References Cited

U.S. PATENT DOCUMENTS

| | | | |
|---|---|---|---|
| 9,403,573 | B1 | 8/2016 | Mazzei et al. |
| 9,744,095 | B1* | 8/2017 | Mazzei .................... A61H 3/04 |
| 9,789,924 | B2* | 10/2017 | Kroymann ............. B62K 13/04 |
| 2006/0131830 | A1 | 6/2006 | Berg ............................. 280/205 |
| 2007/0131461 | A1 | 6/2007 | Treadwell et al. .......... 180/19.1 |
| 2009/0078485 | A1* | 3/2009 | Gutsch ................... A01D 34/67 180/218 |
| 2010/0237645 | A1* | 9/2010 | Trainer ............... G09F 15/0087 296/21 |
| 2011/0121541 | A1* | 5/2011 | Yamano ................... B60D 1/00 280/515 |
| 2011/0221160 | A1 | 9/2011 | Shaw ........................... 280/205 |
| 2014/0008138 | A1 | 1/2014 | Kim et al. .................... 180/216 |

OTHER PUBLICATIONS

Faysal, "I rode the 'Hoverboard' and now I wish levitating skateboards existed"; Oct. 9, 2015 (Oct. 9, 2015), Retrieved from the Internet: URL: http://anabiyanapps.com/i-rode-the-hoverboard-and-now-i-wish-levitating-skateboards-existed/ [retrieved on Nov. 9, 2015], the whole document. (last accessed on Feb. 24, 2017).

Jorge Chapa, "GM and Segway Announce Project P.U.M.A!", Apr. 7, 2009 (Apr. 7, 2009) Retrieved from the Internet: URL: http://inhabitat.com/gm-and-segway-announce-project-puma/ [retrieved on Nov. 9, 2015], the whole document. (last accessed on Feb. 24, 2017).

bturman, "Spotted in Taiwan Alley", Feb. 24, 2011 (Feb. 24, 2011), Retrieved from the Internet: URL: http://www.vitalmx.com/photos/member/2011-Dealer-Expo-Bonus-Gallery,35999/Spotted-in-Taiwan-Alley,44516/bturman,20779 [retrieved on Nov. 9, 2015], the whole document. (last accessed on Feb. 24, 2017).

Shenzhen Counterbalance Technology Co.,Ltd, "Auxiliary Wheel", Retrieved from the Internet: URL: http://www.fwheel.cc/Product-Self-Balancing-Electric-Unicycle/Auxiliary-wheel.html [retrieved on Nov. 9, 2015], the whole document. (last accessed on Feb. 24, 2017).

HoodRiderz, "Ninebot One Training Wheels", Retrieved from the Internet: URL: https://hoodriderz.com/products/ninebot-one-training-wheels [retrieved on Nov. 9, 2015], the whole document. (last accessed on Feb. 24, 2017.

World One Parade, "Ninebot One", Retrieved from the Internet. URL: http://global.rakuten.com/en/store/worldoneparade/item/otm00-0051/ [retrieved on Oct. 28, 2015], the whole document. (last accessed on Oct. 28, 2015) (link no longer available); images of the product that was displayed on this webpage are also viewable at: http://hoverboarderhq.com/product/ninebot-one-unicycle-training-wheels/.

China Flame Group Ltd., "segway/Self Balance Outdoor Sports Scooter fours Wheels 4-wheel Electric Bicycle with 1000W 48V/12ah lead-acid", Retrieved from the Internet. URL: http://flamebikes.company.frbiz.com/199219215-segway-self-balance-outdoor-sports-scooter-four-wheels-4-wheel-electric-with-1000w-48v-12ah-lead-acid/page1.html [retrieved on Oct. 28, 2015], the whole document. (last accessed on Oct. 28, 2015) (link no longer available); images of the product that was displayed on this webpage are also viewable at: http://www.ecvv.com/product/4494399.html.

Hoverboard HQ, "Ninebot One Unicycle Training Wheels", Retrieved from the Internet: URL: http://hoverboarderhq.com/product/ninebot-one-unicycle-training-wheels/ [retrieved on Mar. 8, 2017], the whole document. (last accessed on Mar. 9, 2017).

China Flame Group, Ltd, "Standing-up Electric Scooter with 4 Wheels", Retrieved from the Internet: URL: http://www.ecvv.com/product/4494399.html [retrieved on Mar. 8, 2017], the whole document. (last accessed on Mar. 9, 2017).

* cited by examiner

STABILITY ATTACHMENT FOR A TWO-WHEELED, SELF-BALANCING, PERSONAL TRANSPORTATION VEHICLE

CROSS-REFERENCE TO RELATED APPLICATIONS

This application is related to U.S. Provisional Application Ser. Nos. 62/259,714 and 62/266,229, filed on Nov. 25, 2015 and Dec. 11, 2015, respectively, each entitled "Stability Attachment For A Two-Wheeled, Self-Balancing, Personal Transportation Vehicle", the disclosure of each of which is incorporated herein by reference and on which priority is hereby claimed.

BACKGROUND OF THE INVENTION

Field of the Invention

The present invention relates to two-wheeled, personal transportation vehicles, and more specifically relates to a self-balancing, board-like, personal transportation vehicle, oftentimes referred to as the Hoverboard™, Solowheel™ and Hovertrax™ devices.

Description of the Prior Art

There exists the well-known personal transportation product referred to as the Segway™ device, which is a two-wheeled vehicle on which a person stands and which is self-balanced. Another product becoming popular is a self-balancing, board-like, personal transportation vehicle commonly referred to by the trademarks Hoverboard™, Hovertrax™ and Solowheel™ device. These devices have often been referred to as a Segway™ without a pole. One such two-wheeled, self-balancing vehicle is disclosed in U.S. Pat. No. 8,738,278 (Chen), the disclosure of which is incorporated herein by reference.

One of the problems with such two-wheeled, self-balancing boards is that they are very difficult to ride on or stand up on without falling, especially for those users who have no training. Several weeks of proper training and with the user wearing fully-protected gear are required, as such two-wheeled, self-balancing vehicles are quite unstable and difficult to use, and may result in injury to the user.

OBJECTS AND SUMMARY OF THE INVENTION

It is an object of the present invention to provide an attachment for such two-wheeled, self-balancing, personal transportation vehicles that adds stability to the vehicles, especially for training purposes.

It is another object of present invention to provide a stability attachment for a two-wheeled, personal transportation vehicle, which adds stability to the vehicle and allows a user to acclimate himself to the operation of such vehicles.

It is a further object of the present invention to provide an attachment which provides stability to a two-wheeled, self-balancing, personal transportation vehicle which is attachable to the vehicle for training purposes and removable therefrom once the rider thereof has attained experience in balancing himself while riding on the vehicle.

In accordance with one form of the present invention, a stability device which functions as "training wheels" may be attached to the center of a two-wheeled, self-balancing, personal transportation vehicle to make the vehicle more stable. The attachment includes two extra training wheels fore and aft (in the front and in the rear) of the wheels and interposed stand-on, support platform of the vehicle to provide the vehicle with stability so that a person may learn how to balance himself on the vehicle without falling and injuring himself. The attachment includes a clamp mechanism to mount the stability attachment to the center of the vehicle and to easily allow the user to remove the stability attachment after he has become more competent in using the vehicle and has learned to balance himself when riding on such vehicle.

The training wheels may be adjustably mounted to a pair of telescopic support arms attached to and extending outwardly from the clamp mechanism in opposite directions. More specifically, each of the support arms may be formed as two or more telescopic components, which are adjustable axially relative to each other to vary the length of the support arm and the distance between the training wheels and the support platform of the vehicle. Also, each wheel situated at the free end of a corresponding support arm is adjustable in height by the user to insure, if desired by the user, that both training wheels simultaneously contact the ground when the vehicle is being ridden.

These and other objects, features and advantages of the present invention will be apparent from the following detailed description of illustrative embodiments thereof, which is to be read in connection with the accompanying drawings.

DETAILED DESCRIPTION OF THE PREFERRED EMBODIMENTS

Figure 1:
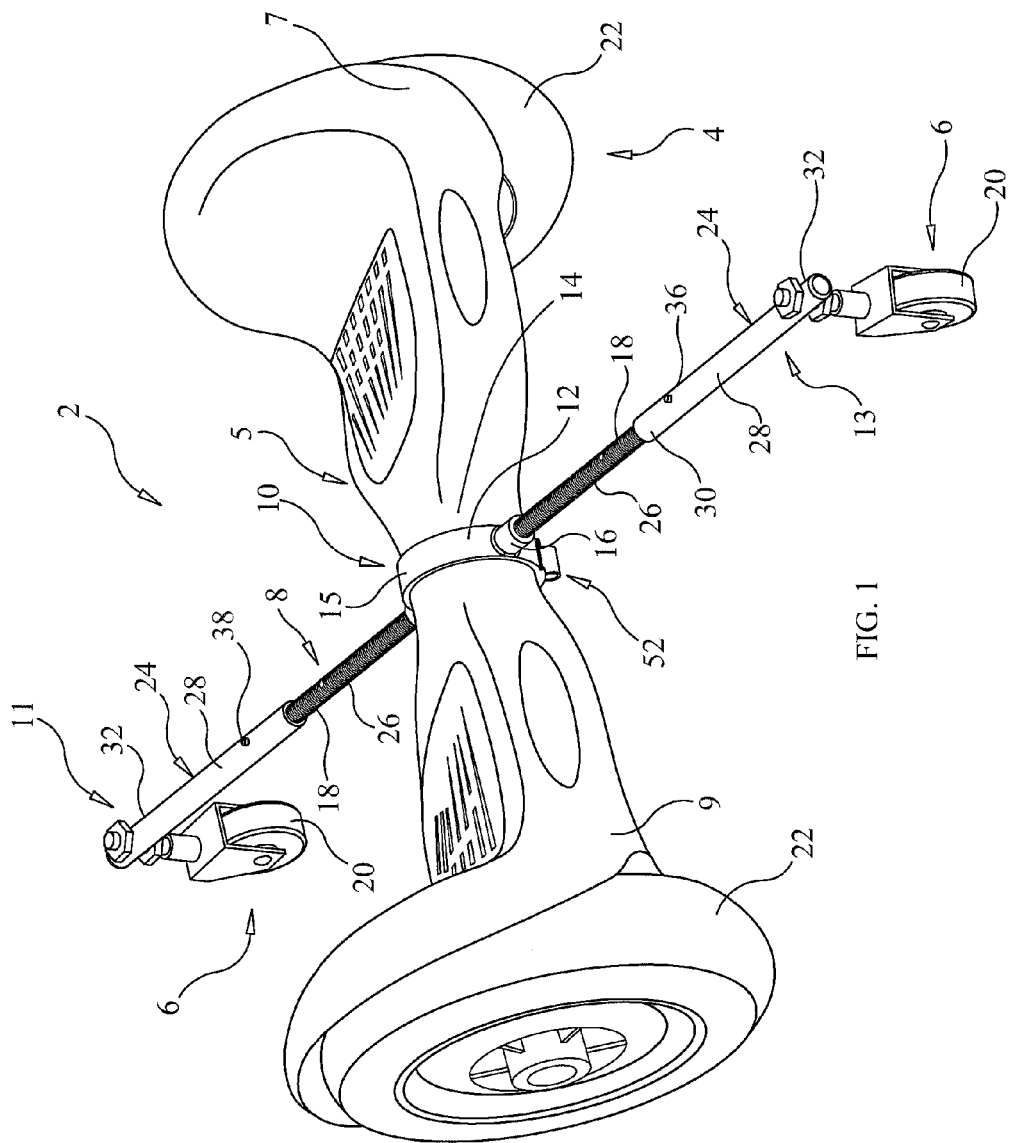
FIG. 1 is a perspective view of a stability attachment constructed in accordance with one form of the present invention for mounting on a two-wheeled, self-balancing, personal transportation vehicle.
Figure 2:
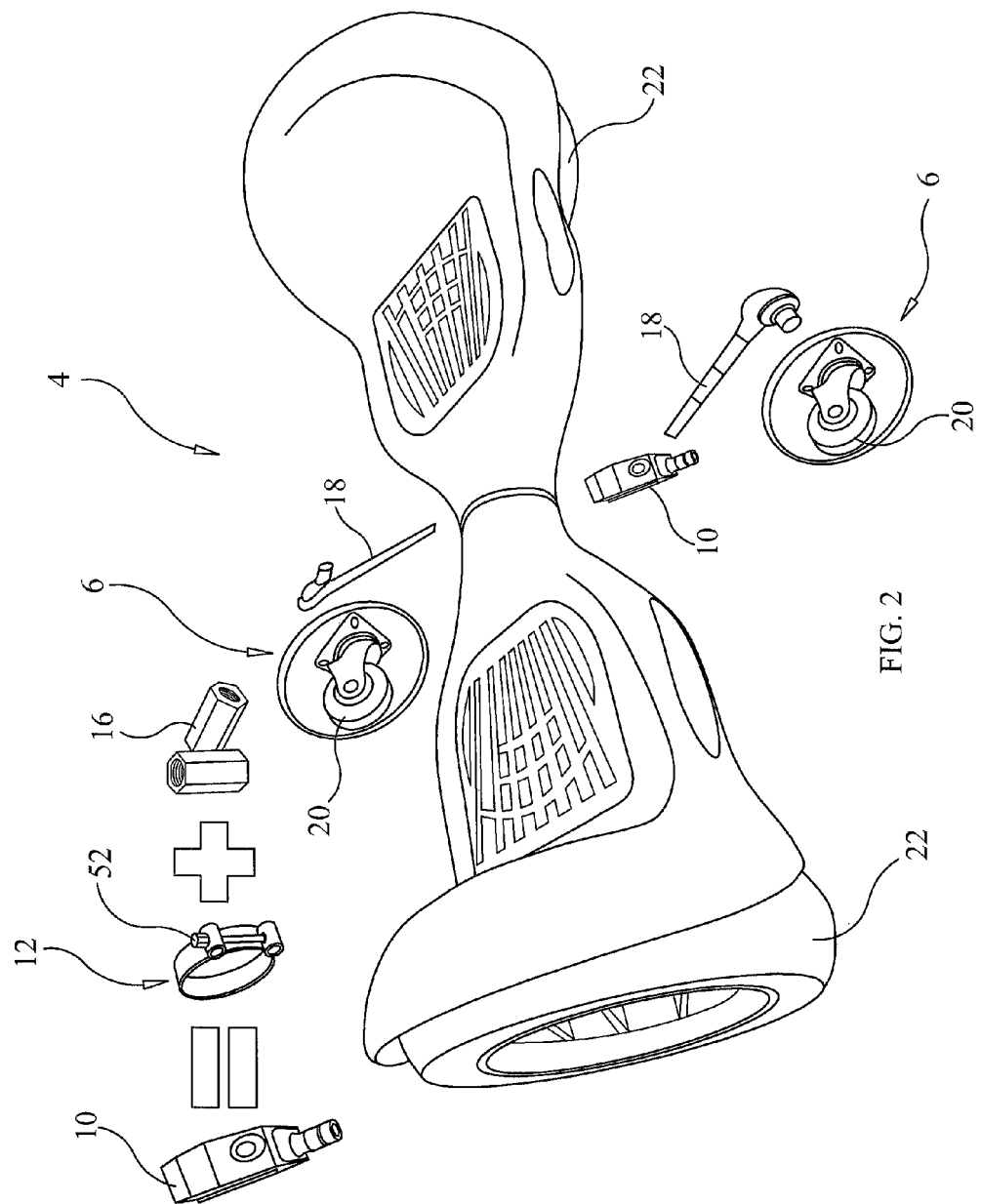
FIG. 2 is an exploded, perspective view of the stability attachment constructed in accordance with another form of the present invention.

As can be seen from FIGS. 1-14 of the drawings, a stability attachment 2 for mounting on a two-wheeled, self-balancing, personal transportation vehicle 4 basically includes a pair of spaced apart training wheels 6, a frame 8 to which the training wheels 6 are attached, and a clamp mechanism 10 to allow the stability attachment 2 to be selectively mounted on the two-wheeled vehicle 4. In one form, the stability attachment 2 includes a heavy duty universal metal band clamp 12 which is adjustable from about two inches to about five inches depending upon the diameter of the central part 14 of the board or platform 5 on which a rider stands and which extends between the wheels 6 of the vehicle. The metal band clamp 12 may include a metal nut 16 that is welded on the metal band 15 thereof on each opposite side of the metal band 15. The frame 8 also includes elongated, threaded, metal support arms 18. Both metal nuts 16 will have the same thread as the metal support arms 18 forming part of the frame 8, so that both metal support arms 18, similar to an idle arm that is found in most vehicles, can screw into the metal nuts 16, one metal support arm 18 for each side, such as shown in FIGS. 2-10 and 12-14 of the drawings. At the end of each metal support arm 18 is mounted a heavy duty, 360° rotatable caster wheel 20 preferably having a three inch diameter. The length of each metal support arm 18 preferably can be adjusted or extended from about six inches to about twelve inches, similar to the idle arm in most vehicles; however, the recommended length of the metal support arm 18 should be equal to the length measured from the center of the vehicle to which it is attached to its side wheels 22. The caster wheels 20 of the stability attachment 2, when mounted on the vehicle 4, would be positioned fore and aft of the central part 14 of the support platform 5 on which it is mounted and the side wheels 22 of the vehicle 4.

Figure 8:
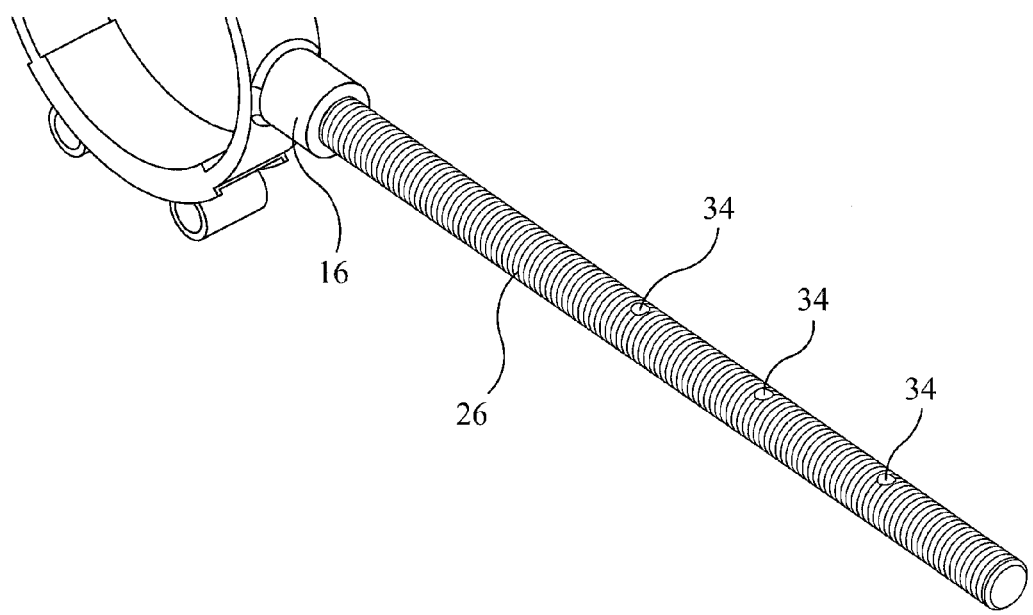
FIG. 8 is a perspective view of a stability attachment constructed in accordance with the form of the present invention shown in FIGS. 3 and 5-7 for mounting on a two-wheeled, self-balancing, personal transportation vehicle, and illustrating one form of the inner rod of the telescopically adjustable support arm.
Figure 9:
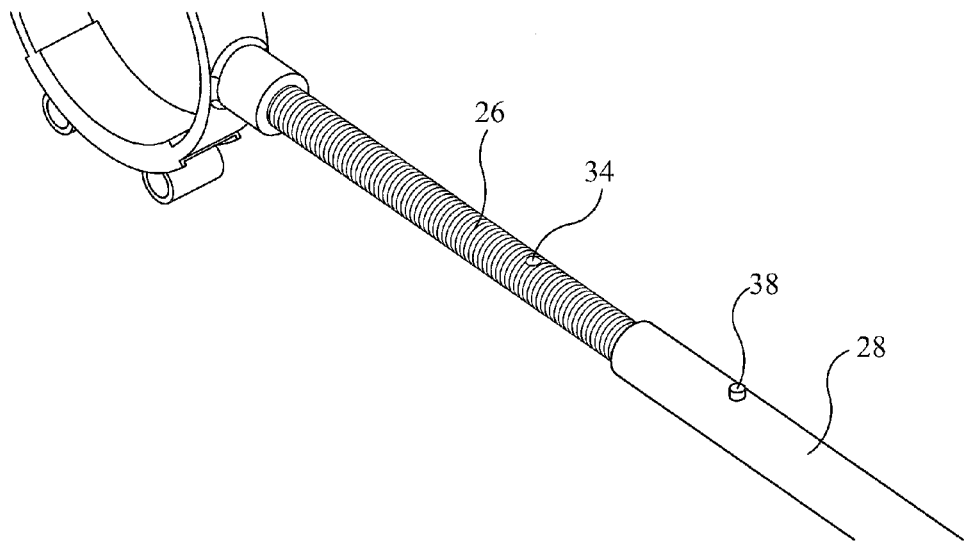
FIG. 9 is a perspective view of a stability attachment constructed in accordance with the form of the present invention shown in FIGS. 3 and 5-8 for mounting on a two-wheeled, self-balancing, personal transportation vehicle, and illustrating one form of the outer tube of the telescopically adjustable support arm partially threaded on the inner rod.
Figure 10:
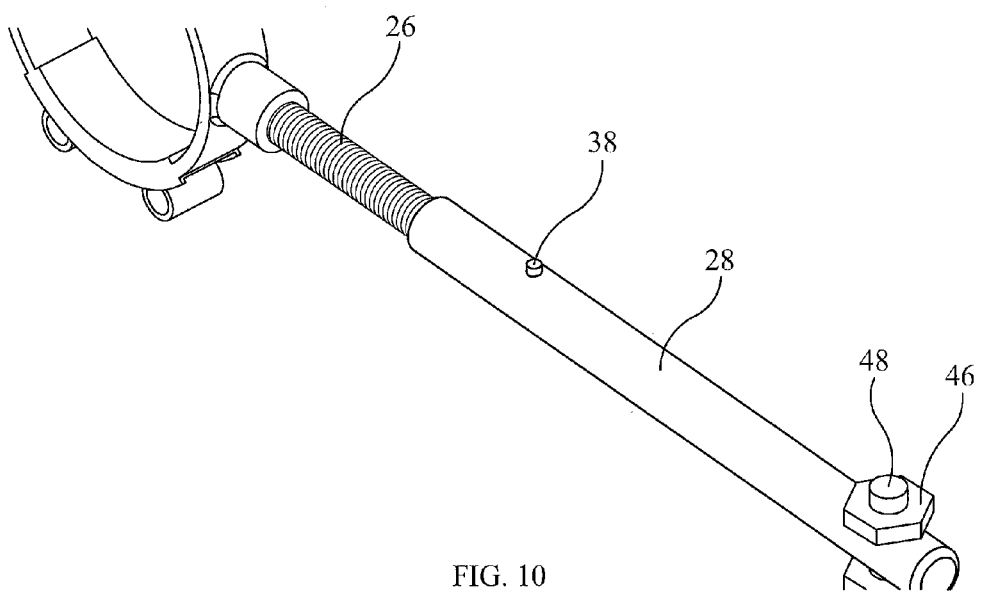
FIG. 10 is a perspective view of a stability attachment constructed in accordance with the form of the present invention shown in FIGS. 3 and 5-9 for mounting on a two-wheeled, self-balancing, personal transportation vehicle, and illustrating the outer tube of the telescopically adjustable support arm partially threaded on the inner rod.

In a preferred embodiment of the present invention, as shown in FIGS. 3-14, each of the support arms 18 includes two tubular sections 24 that enable the length of the support arm 18 to be telescopically adjusted. More specifically, each support arm 18 includes a first tubular section 26 and a second tubular section 28. The first tubular section 26, which is preferably formed as an inner rod having a threaded outer surface, may be screwed into one of the metal nuts 16 of the band clamp 12, as shown in FIGS. 8-10. The second tubular section 28 is preferably formed as an outer tube having a bore with a threaded inner surface that corresponds to the thread pattern on the outer surface of the inner rod 26. As can be seen in FIGS. 9 and 10 of the drawings, a first axial end 30 of the second tubular section 28 is screwed onto the inner rod 26 attached to the band clamp 12. The rotatable caster wheel 20 is mounted to the opposite, second axial end 32 of each second tubular section 28, as shown in FIGS. 3, 5-7 and 11-14. Accordingly, the length of each support arm 18 may be telescopically adjusted by screwing/unscrewing the second tubular section 28 on the first tubular section 26, as shown in FIGS. 9 and 10. Thus, the distance between each caster wheel 20 (preferably measured from the wheel axle or bottom of the wheel) and the center of the vehicle 4 can be adjusted.

Figure 11:
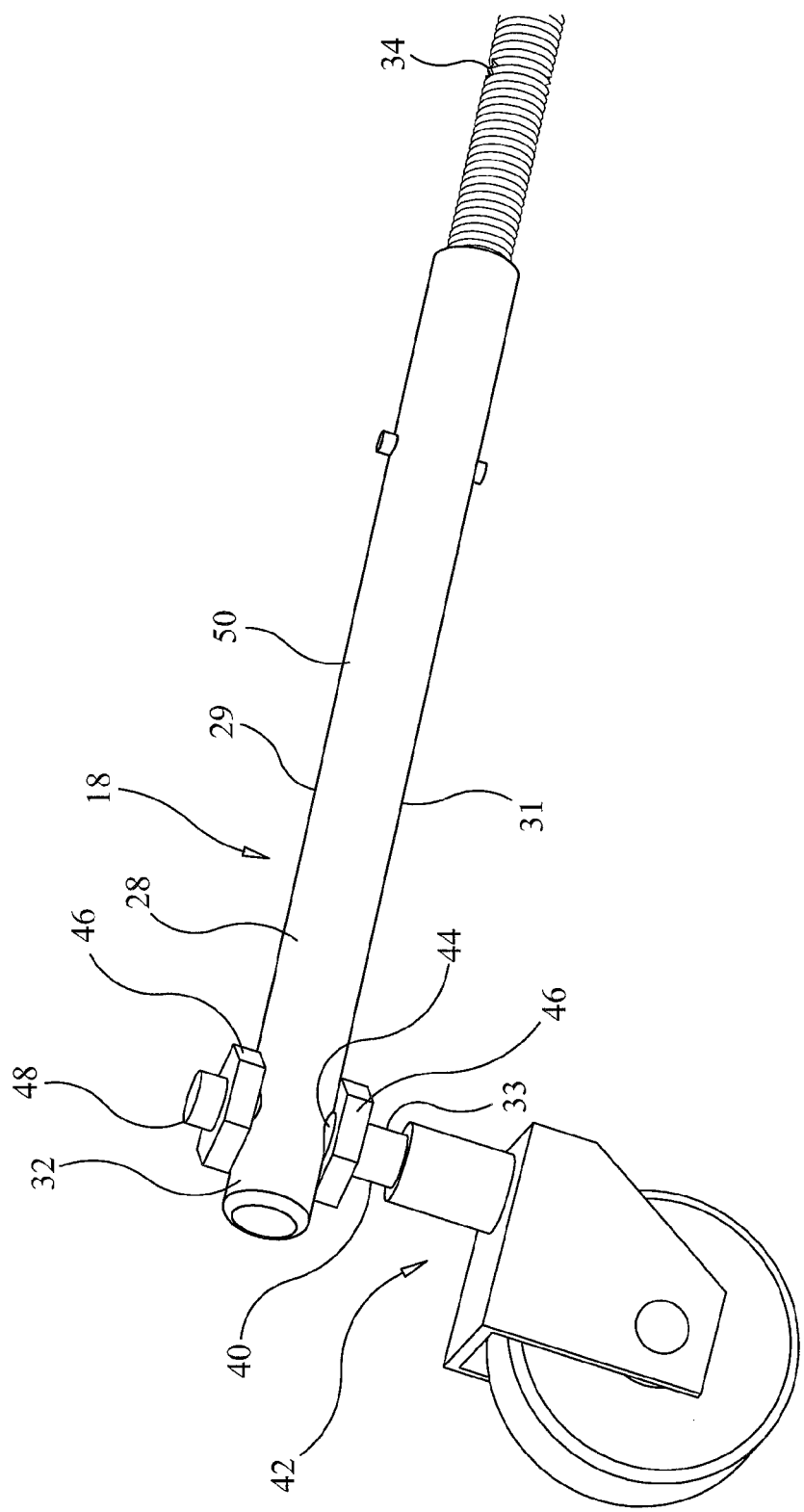
FIG. 11 is a perspective view of a stability attachment constructed in accordance with the form of the present invention shown in FIGS. 3 and 5-10 for mounting on a two-wheeled, self-balancing, personal transportation vehicle, and illustrating the mechanism for adjusting the height of the training wheels relative to the support arms on which they are mounted.
Figure 12:
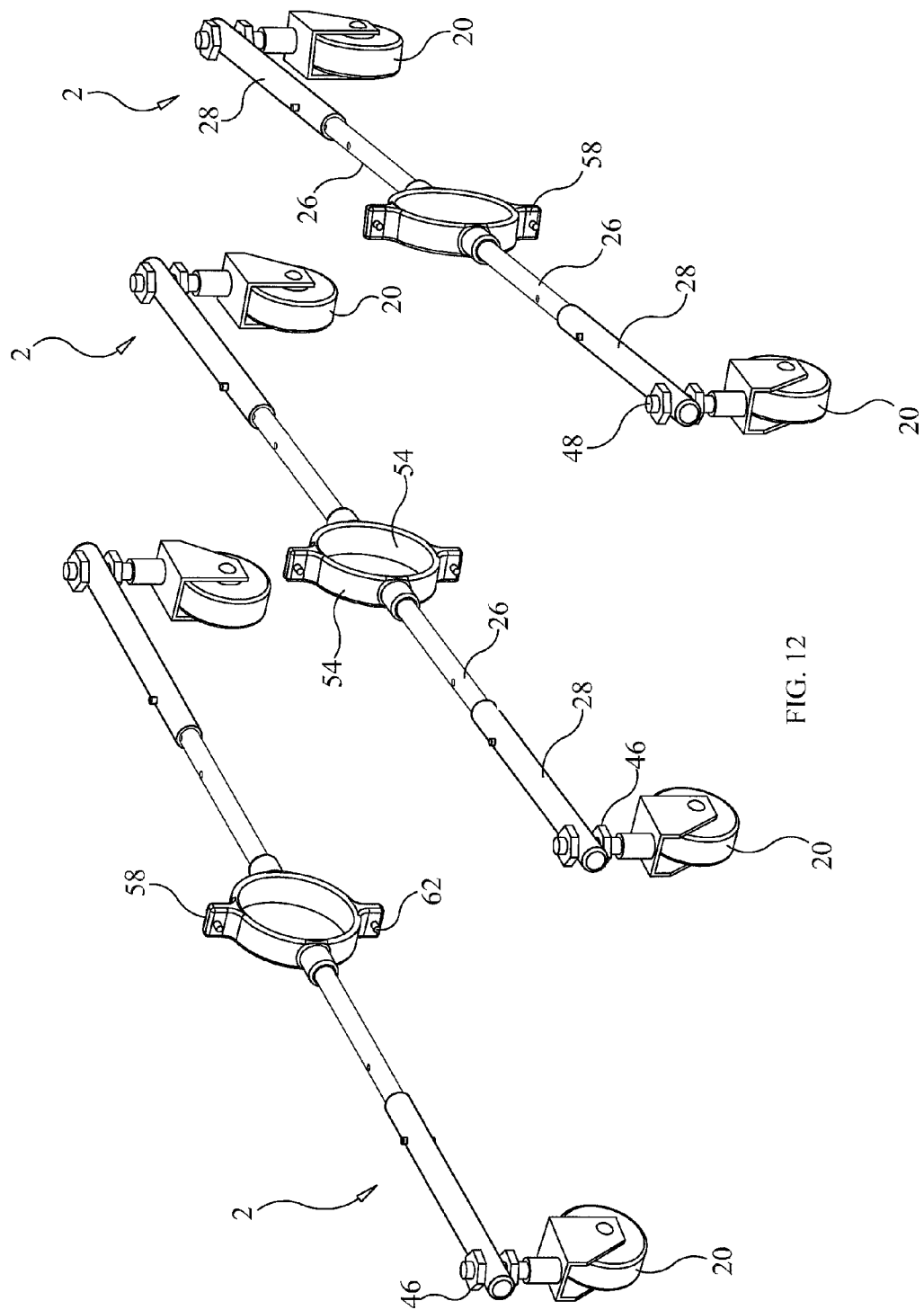
FIG. 12 is a front perspective view of several stability attachments constructed in accordance with the form of the present invention shown in FIG. 4 for mounting on a two-wheeled, self-balancing, personal transportation vehicle, and showing the unthreaded telescopic tubular sections of the support arms and the clamping mechanism of the embodiment shown in FIG. 4, and further illustrating that the stability attachment of the present invention may be manufactured in a variety of colors to match or complement the colors of the vehicles to which they are attached.
Figure 13:
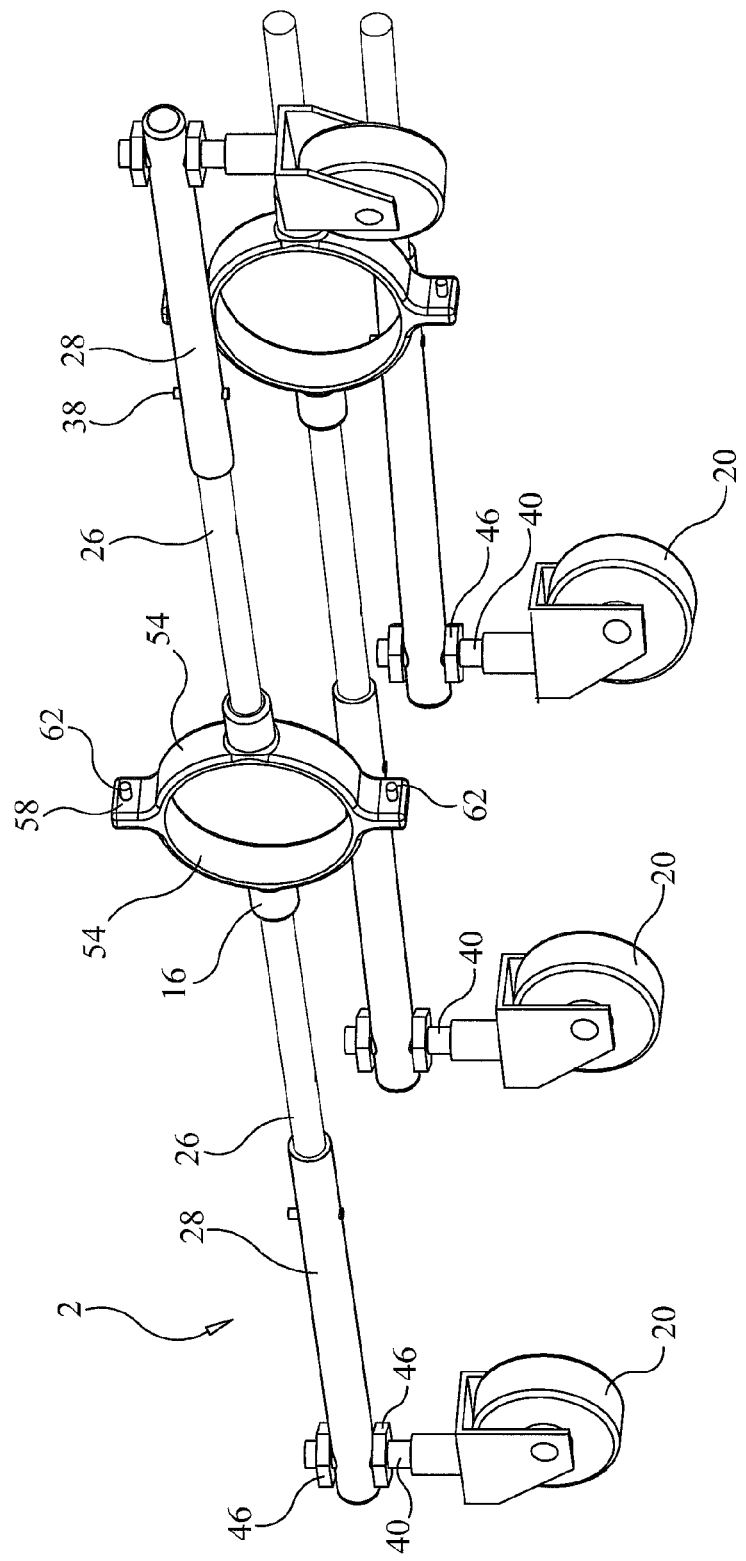
FIG. 13 is a side perspective view of several stability attachments constructed in accordance with the form of the present invention shown in FIGS. 4 and 12 for mounting on a two-wheeled, self-balancing, personal transportation vehicle.
Figure 14:
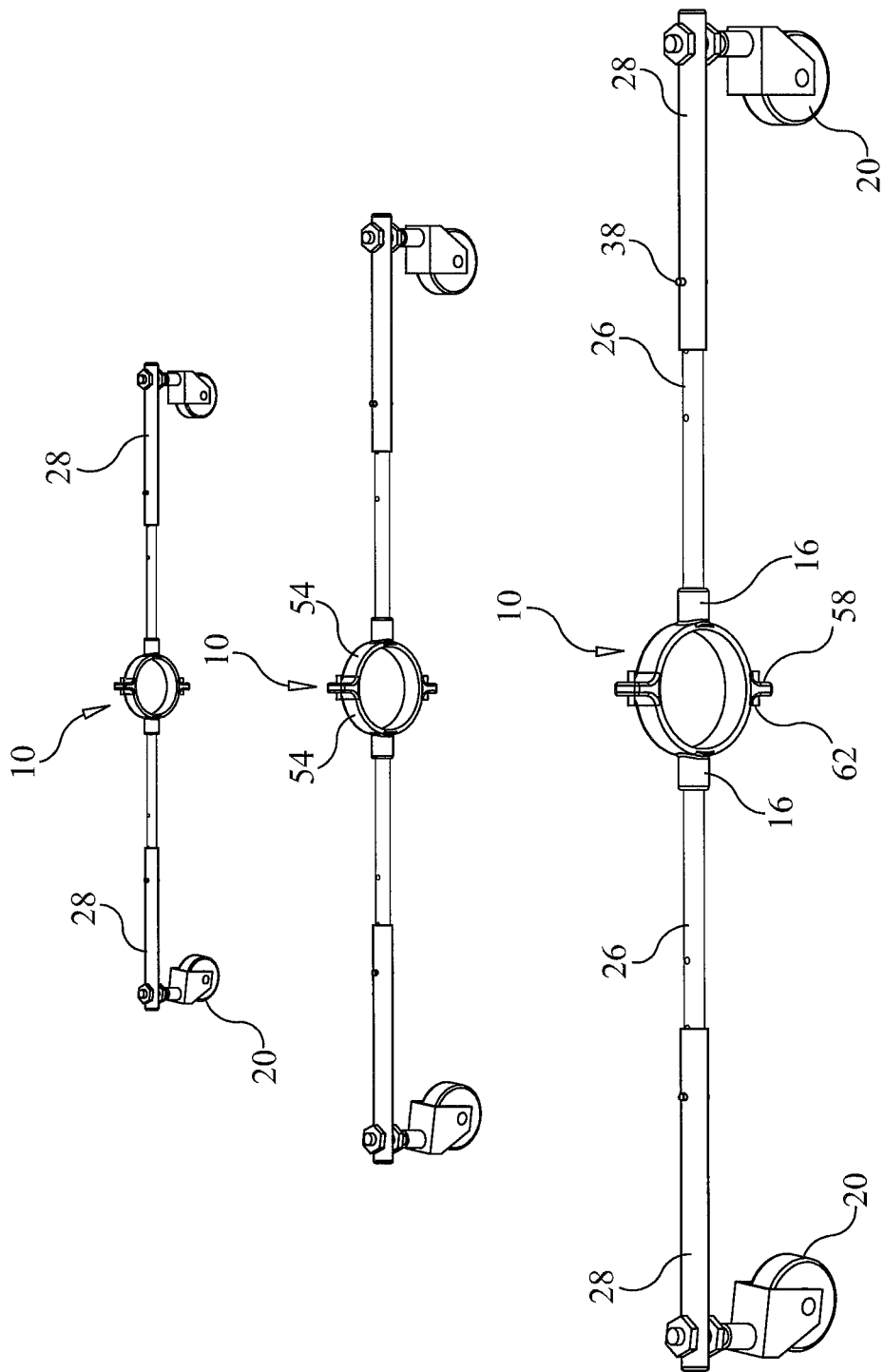
FIG. 14 is a top perspective view of several stability attachments constructed in accordance with the form of the present invention shown in FIGS. 4, 12 and 13 for mounting on a two-wheeled, self-balancing, personal transportation vehicle.

As shown in FIG. 8 of the drawings, the first tubular sections 26 may further include at least one hole 34 formed diametrically therethrough. Preferably, a series of holes 34 is formed in a spaced apart pattern along at least a portion of the axial length of each first tubular section 26. As shown in FIGS. 9-11, each of the second tubular sections 28 also preferably includes at least one hole 36, or a plurality of spaced apart holes 36, formed diametrically therethrough so that, as the length of the support arm 18 is telescopically adjusted, the holes 34 in the first tubular section 26 and the holes 36 of the second tubular section 28 of each arm may be aligned at a particular relative length and may receive a locking pin 38 therethrough. The locking pin 38 resists unintentional telescopic movement or relative rotation of the second tubular section 28 on the first tubular section 26. Accordingly, once each support arm 18 is adjusted to a desired length, the locking pin 38 or pins may be inserted through the aligned holes 34, 36 in the first tubular section 26 and the second tubular section 28 of each arm 18. As shown in FIGS. 12-14, it is also envisioned to be within the scope of the present invention to utilize unthreaded first and second tubular sections for one or both arms which may be telescopically slidably adjusted to a particular length and fixed with the cooperating locking pin 38 and hole 36 structure described herein.

In yet a further embodiment of the present invention, the caster wheels 20 may be adjustably mounted to the support arms 18 so that the caster wheels 20 may be raised and lowered. More specifically, as shown in FIG. 11 of the drawings, a threaded rod 40 or pin may extend from a caster wheel mounting flange 42 through a bore 44 formed diametrically through the second axial end 32 of the support arm 18, or second tubular section 28 thereof. At least one adjustment nut 46 may be screwed onto a free axial end 48 of the threaded rod 40 or pin extending through a top surface 50 of the support arm 18. In FIG. 11, two adjustment nuts 46 are shown as being provided and threaded onto the caster wheel mounting pin 40 and situated above and below the support arm 18. As the adjustment nut 46 or nuts are rotated on the threaded caster wheel mounting rod 40 or pin, depending on the direction (e.g., clockwise or counterclockwise), the length of threaded rod 40 extending from the top surface 50 of the support arm 18 may be increased or decreased. Accordingly, the height of the wheel mounting flange 42, which is affixed to the threaded rod 40 or pin, may be adjusted by rotating the nut 46 or nuts on the threaded mounting pin 40. Thus, the height of the caster wheel 20 relative to the support arm 18 on which it is mounted may be selectively adjusted.

Such a height adjustment of the caster wheels 20 is useful to compensate for vehicles 4 having drive wheels 22 of varying diameters. For example, certain manufacturers utilize larger drive wheels 22 which would require the relative height of the caster wheel 20 to be lowered so that the caster wheels 20 are in proximity with and preferably simultaneously or independently contact the ground. Furthermore, the height adjustment of the caster wheels 20 allows a user to selectively adjust the point at which the training device 2 provides support. For example, a more advanced user may raise the relative height of the caster wheels 20 so that they do not come in contact with the ground during normal vehicle movement, or such that the fore and aft wheels 20 contact the ground non-simultaneously. Similarly, a less skilled user may lower the relative height of the caster wheels 20 so that both fore and aft wheels always contact the ground whether the vehicle 4 is at rest or moving.

There are described herein at least two clamp mechanisms 10 which may be used to affix the support arms of the stability attachment to the center of the two-wheeled, self-balancing, personal transportation vehicle 4. In most personal transportation vehicles 4 currently being marketed, the center of the support platform 14 of the vehicle 4 on which the person stands is circular in transverse cross-section. As mentioned previously, and as shown in FIGS. 2, 3 and 5-10 of the drawings, a band-type clamp 12 similar to a hose clamp is preferably used. The band 15 of the clamp 12 may be tightened about itself to reduce its overall diameter by turning one or more screws 52 mounted thereon. Initially, the opposite ends of the band 15 may be separated from each other so that the band 15 may be slipped over and onto the center 14 of the support platform or main body 5 of the vehicle 4 on which the user stands. Then, at least one end of the band 12 may be slipped through the adjustment mechanism on the clamp which includes the tightening screw 52, and tightened about the center of the vehicle 4 to secure the stability attachment 2 thereto.

In another embodiment of the present invention, and as shown in FIGS. 4 and 12-14 of the drawings, the clamp mechanism 10 for affixing the stability attachment 2 of the present invention to the vehicle 4 may be formed from two semi-circular, half ring segments 54. The two half ring segments 54 are detachable from each other so that the center of the support platform 14 of the vehicle 4 may be placed between them. Each half ring segment 54 includes a concave portion 56 and two diametrically opposite flanges 58 which extend outwardly in opposite directions from the concave portion 56. The center 14 of the vehicle 4 is positioned between the concave portions 56 of the half ring segments 54 so that the half ring segments 54 face each other with the center 14 of the vehicle 4 therebetween. The outwardly extending flanges 58 of each half ring segment 54 include openings 60 formed through the thickness thereof, and such openings 60 of one half ring segment 54 are positioned to be in alignment with corresponding openings 60 of the other half ring segment 54 when the half ring segments 54 of the clamp mechanism 10 are properly positioned on diametrical opposite sides of the center portion 14 of the vehicle 4. A threaded bolt 62 or screw may pass through the aligned flange openings 60 of the half ring segments 54 of the clamp 10, and a nut 66 may be threaded onto the bolts 62 or screws to secure the half ring segments 54 of the clamp 10 together and to the personal transportation vehicle 4 situated therebetween. The clamp mechanism 10 may come in different sizes to accommodate vehicles 4 with center portions 14 of different diameters. Alternatively, spacers 64 may be placed in between the facing flanges 58 of the half ring segments 54 to enlarge or reduce the overall diameter of the opening 68 defined by the half ring segments 54 through which the center portion 14 of the vehicle 4 is received, in order to accommodate vehicles 4 having different diameter center portions 14.

Of course, it is envisioned to be within the scope of the present invention to include different clamp mechanisms 10 for securing the stability attachment 2 of the present invention to a two-wheeled, self-balancing, personal transportation vehicle 4 than those shown in the drawings and described above.

Certain features of the stability attachment of the present invention will now be described.

A stability attachment 2 for mounting to a personal transportation vehicle 4 to stabilize the vehicle 4 is disclosed herein. The personal transportation vehicle 4 has a main body 5 forming a platform on which an operator stands. The main body 5 has a first lateral end 7 and a second lateral end 9 disposed opposite the first lateral end 7 and extending in a direction therebetween. The personal transportation vehicle 4 further includes a first drive wheel 22 situated at the first lateral end 7 of the main body 5 and a second drive wheel 22 situated at the second lateral end 9 of the main body 5.

In one form of the present invention, the stability attachment 2 includes a frame 8 having a first axial end 11 and a second axial end 13 disposed opposite the first axial end 11, the frame 8 being selectively mountable on the main body 5 of the personal transportation vehicle 4 and extending outwardly therefrom and generally transversely thereto when mounted thereon.

The stability attachment 2 also includes at least a first wheel 6 and a second wheel 6. The first wheel 6 is situated on the frame 8 in proximity to the first axial end 11 thereof, and the second wheel 6 is situated on the frame 8 in proximity to the second axial end 13 thereof. The first wheel 6 and the second wheel 6 are situated on diametrically opposite sides of the main body 5 of the personal transportation vehicle 4 when the stability attachment 2 is mounted thereon.

The stability attachment 2 further includes structure for attaching the frame 8 to the personal transportation vehicle 4. In one form, this structure includes at least one clamp mechanism 10 affixed to the frame 8 and situated between the first axial end 11 and the second axial end 13 of the frame 8. The at least one clamp mechanism 10 is engageable with a portion, such as the central part 14, of the main body 5 of the personal transportation vehicle 4 to selectively mount the frame 8 thereto.

In a preferred form of the present invention, the clamp mechanism 10 of the stability attachment 2 is formed as a band clamp 12. The band clamp 12 has an adjustment mechanism and an attachment band 15 extending therefrom. The attachment band 15 has a free end that may be fitted over the main body 5 of the personal transportation vehicle 4 and engaged with the adjustment mechanism. The adjustment mechanism has at least one tightening screw 52 that is selectively rotatable to advance and retract the free end of the attachment band 15 through the adjustment mechanism. The selective rotation of the tightening screw 52 adjusts the overall diameter of the attachment band 15 to tighten or loosen the attachment band 15 to the main body 5 of the personal transportation vehicle 4 when the stability attachment 2 is mounted thereon.

Preferably, the band clamp 12 is adjustable between about two inches in diameter and about five inches in diameter.

In another form of the present invention, the clamp mechanism 10 of the stability attachment 2 includes a first mating segment 54 and a second mating segment 54 situated opposite the first mating segment 54. The first mating segment 54 and the second mating segment 54 are attachable to and are situatable on diametrically opposite sides of the main body 5 of the personal transportation vehicle 4 when the stability attachment 2 is mounted thereon. Each of the first mating segment 54 and the second mating segment 54 has a first end 17 and a second end 19 disposed opposite the first end 17. The first mating segment 54 and the second mating segment 54 are engageable with one another to define the clamp mechanism 10.

Even more preferably, the first mating segment 54 and the second mating segment 54 are formed as half ring segments, each half ring segment having a concave portion 56 and first and second end flanges 58 situated on opposite ends of the concave portion 56 and respectively at the first and second ends 17, 19 of the first and second mating sections 54. The first and second mating sections 54, when joined together, define between the concave portions 56 an opening 68 for receiving therein preferably the central portion 14 of the main body 5 of the personal transportation vehicle 4.

Preferably, each of the first and second end flanges 58 of the first mating segment 54 and each of the first and second end flanges 58 of the second mating segment 54 has an opening 60 formed through the thickness thereof. In this embodiment, the clamp mechanism 10 further includes fasteners 62. The fasteners 62 are receivable by the openings 60 formed in the first and second end flanges 58 of the first and second mating segments 54. The fasteners 62 join aligned first end flanges 58 of the first mating segment 54 and the second mating segment 54 and aligned second end flanges 58 of the first mating segment 54 and the second mating segment 54.

The clamp mechanism 10 described above may further include spacers 64. More specifically, the clamp mechanism 10 includes at least a first spacer 64 and a second spacer 64. The first spacer 64 is situated between the first end flanges 58 of the first mating segment 54 and the second mating segment 54, and the second spacer 64 is situated between the second end flanges 58 of the first mating segment 54 and the second mating segment 54 when the first mating segment 54 and the second mating segment 54 are joined together. With this clamp structure, the distance between the first mating segment 54 and the second mating segment 54, when joined together, is selectively adjustable by inserting or removing the first spacer 64 and the second spacer 64 between the first end flanges 58 and the second end flanges 58 of the first mating segment 54 and the second mating segment 54.

Figure 3:
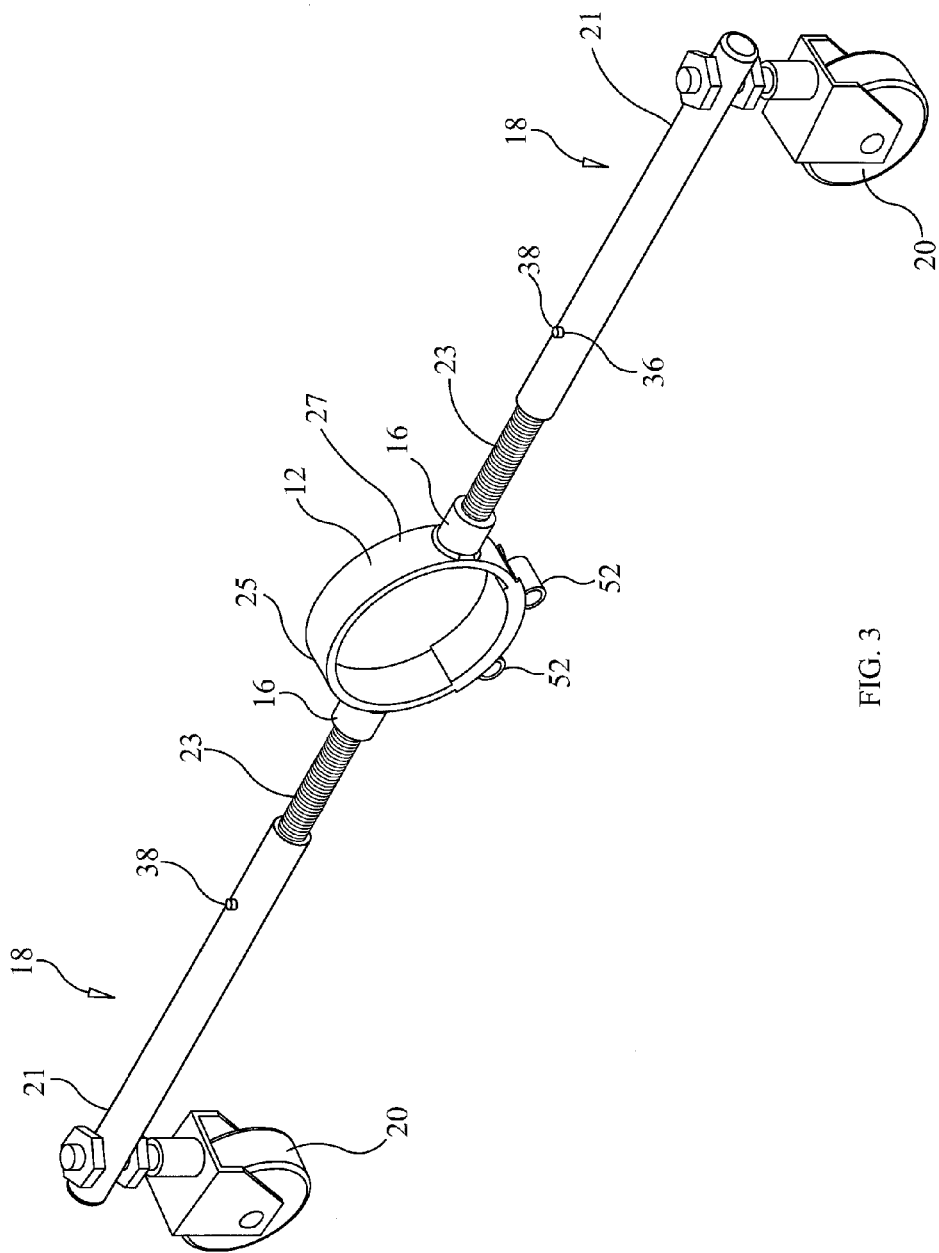
FIG. 3 is a perspective view of a stability attachment constructed in accordance with one form of the present invention for mounting on a two-wheeled, self-balancing, personal transportation vehicle.

In another form of the stability attachment of the present invention, as shown in FIG. 3 of the drawings, the frame 8 includes at least an elongated first support arm 18 and an elongated second support arm 18 extending in a substantially opposite direction to that of the first support arm 18. Each of the first support arm 18 and the second support arm 18 has a first axial end 21 and a second axial end 23 situated opposite the first axial end 21. The second axial ends 23 of the first support arm 18 and the second support arm 18 are connected to diametrically opposite sides of the clamp mechanism 10. The first wheel 6 (preferably, a caster wheel 20) is situated on the first support arm 18 in proximity to the first axial end 21 thereof, and the second wheel 6 (preferably, a caster wheel 20) is situated on the second support arm 18 in proximity to the first axial end 21 thereof.

The clamp mechanism 10 in the embodiment of the stability attachment 2 described above further preferably includes a first side 25 and a second side 27 disposed opposite the first side 25, and a first attachment nut 16 and a second attachment nut 16. The first attachment nut 16 is mounted on the first side 25 of the clamp mechanism 10, and the second attachment nut 16 is mounted on the second side 27 of the clamp mechanism 10. Each of the first attachment nut 16 and the second attachment nut 16 has a threaded bore. The second axial ends 23 of the first and second support arms 18 include a threaded outer surface extending along at least a portion of the axial length thereof. The second axial end 23 of the first support arm 18 is threadingly engaged with the first attachment nut 16, and the second axial end 23 of the second support arm 18 is threadingly engaged with the second attachment nut 16.

In a further preferred form of the stability attachment 2 of the present invention, at least one of the first support arm 18 and the second support arm 18 includes at least a first telescoping member 26 and a second telescoping member 28. The first telescoping member 26 is at least partially receivable within the second telescoping member 28 and is selectively extendable therefrom and retractable therein to adjust the overall length of the at least one of the first support arm 18 and the second support arm 18. Preferably, the overall length of the at least one of the first support arm 18 and the second support arm 18 is adjustable between about six inches and about twelve inches.

Even more preferably, at least one of the first telescoping member 26 and the second telescoping member 28 has at least one hole 34, 36 formed therein, and at least the other of the first telescoping member 26 and the second telescoping member 28 has a plurality of spaced apart holes 34, 36 formed therein and along at least a portion of the axial length thereof. The stability attachment 2 further includes at least one pin 38. The overall length of the at least one of the first support arm 18 and the second support arm 18 is fixed by aligning the at least one hole 34 of the first telescoping member 26 with a respective hole 36 of the second telescoping member 28 and inserting the pin 38 in the aligned holes 34, 36.

Figure 4:
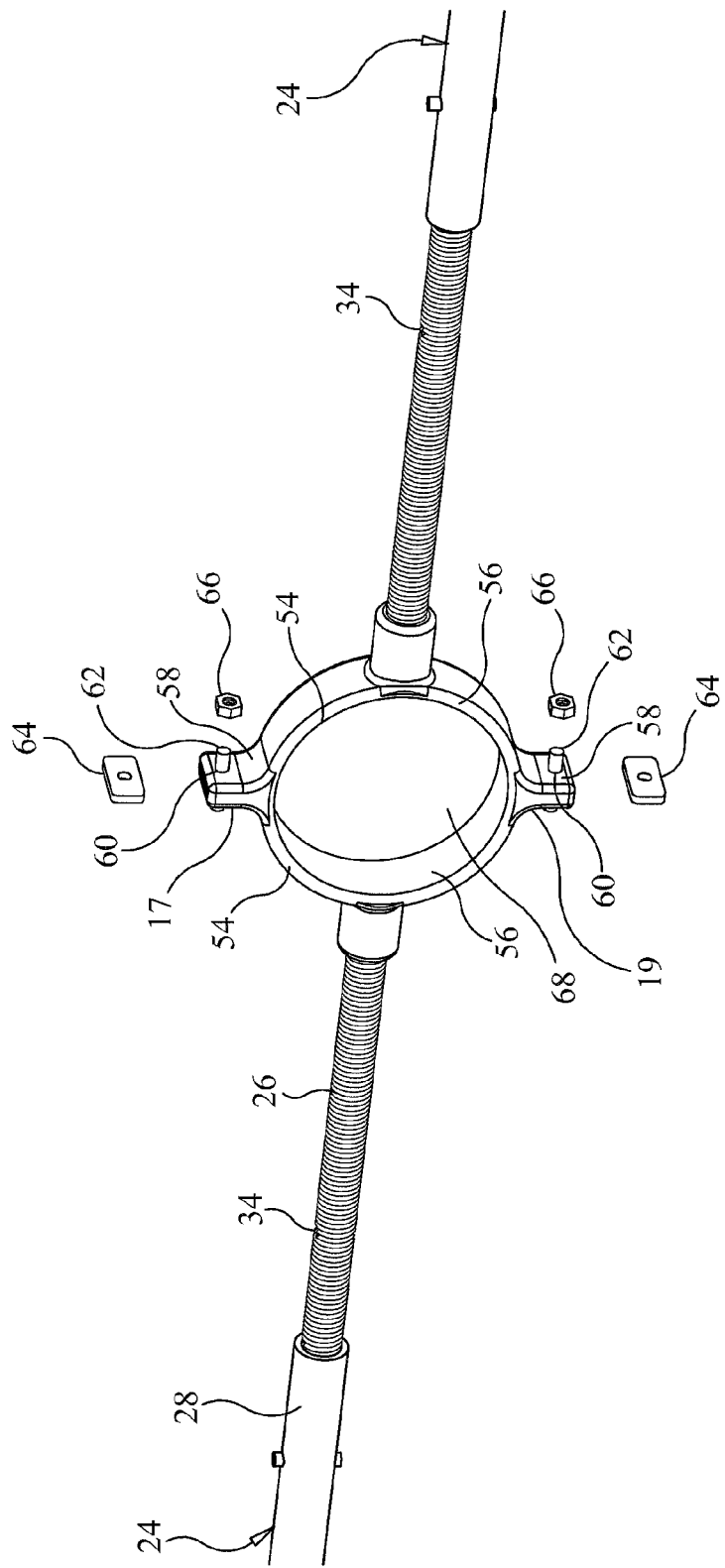
FIG. 4 is a side perspective view of a stability attachment constructed in accordance with another form of the present invention for mounting on a two-wheeled, self-balancing, personal transportation vehicle.
Figure 5:
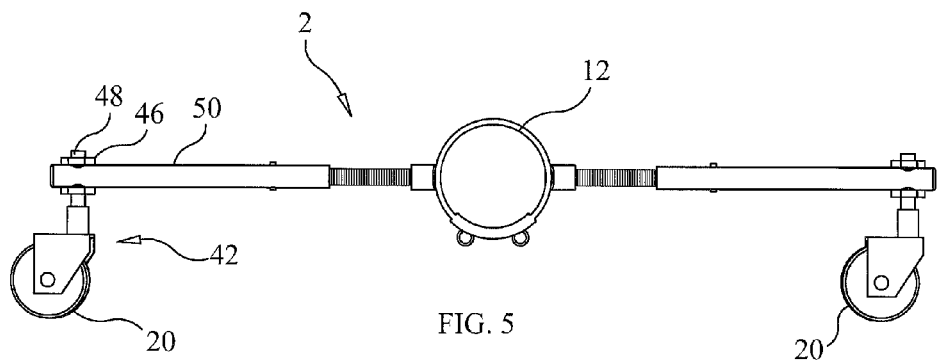
FIG. 5 is a side elevational view of a stability attachment constructed in accordance with the form of the present invention shown in FIG. 3 for mounting on a two-wheeled, self-balancing, personal transportation vehicle.
Figure 6:
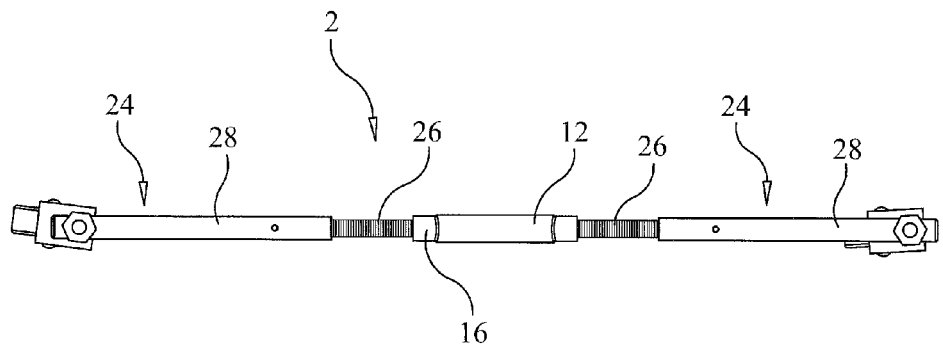
FIG. 6 is a top plan view of a stability attachment constructed in accordance with the form of the present invention shown in FIGS. 3 and 5 for mounting on a two-wheeled, self-balancing, personal transportation vehicle.
Figure 7:
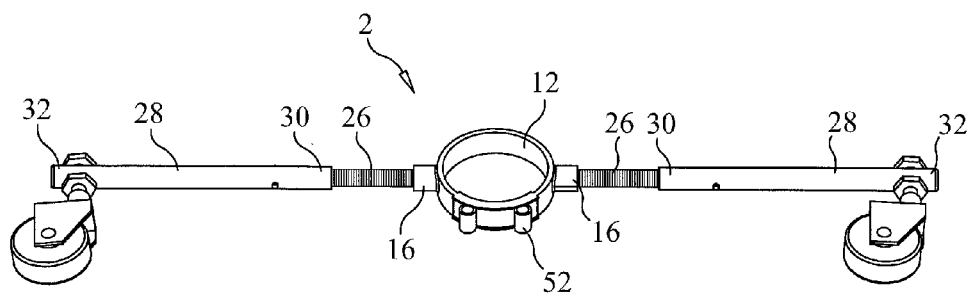
FIG. 7 is a bottom perspective view of a stability attachment constructed in accordance with the form of the present invention shown in FIGS. 3, 5 and 6 for mounting on a two-wheeled, self-balancing, personal transportation vehicle.

In an alternative form of the stability attachment 2 of the present invention, as shown in FIG. 4 of the drawings, at least one of the first telescoping member 26 and the second telescoping member 28 of the at least one of the first support arm 18 and the second support arm 18 of the frame 8 includes a threaded bore extending along at least a portion of the axial length thereof, and at least the other of the first telescoping member 26 and the second telescoping member 28 includes a threaded outer surface extending along at least a portion of the axial length thereof. The first telescoping member 26 and the second telescoping member 28 are in threading engagement with one another. The overall length of the at least one of the first support arm 18 and the second support arm 18 is selectively adjustable by respectively rotating in a first direction and in a second direction which is opposite to the first direction one of the first telescoping member 26 and the second telescoping member 28 relative to the other of the first telescoping member 26 and the second telescoping member 28.

In yet another preferred form of the stability attachment 2 of the present invention, at least one of the first wheel 6 and the second wheel 6 is a rotatable caster wheel 20.

In yet another form of the present invention, the frame 8 of the stability attachment 2 includes a bottom surface 31. The first wheel 6, 20 and the second wheel 6, 20 respectively extend outwardly from the bottom surface a first distance and a second distance (each preferably measured from the wheel axle or bottom of the wheel). The frame 8 further includes structure for independently adjusting the first distance and the second distance the first wheel 6, 20 and the second wheel 6, 20 respectively extend outwardly from the bottom surface 31 of the frame 8. Each of the first axial end 11 and the second axial end 13 of the frame 8 has an opening 44 formed therein, and the structure for independently adjusting the first distance and the second distance preferably includes at least a first rod 40 and a second rod 40, each of the rods 40 preferably being threaded. The first wheel 6, 20 is operatively coupled to the first rod 40, and the second wheel 6; 20 is operatively coupled to the second rod 40. The first and second rods 40 are respectively received by the openings 44 formed in the first axial end 11 and the second axial end 13 of the frame 8. If the rods 40 are threaded, then preferably there is at least one adjustment nut 46 that is threadingly mounted on each of the first rod 40 and the second rod 40. The at least one adjustment nut 46 is rotatable on each of the first rod 40 and the second rod 40 to respectively independently adjust the first distance and the second distance which the first wheel 6, 20 and the second wheel 6, 20 extend outwardly from the bottom surface of the frame 8.

In another preferred form of the stability attachment 2 of the present invention, as shown in FIG. 11 of the drawings, the frame 8 has a top surface 29 and a bottom surface 31 disposed opposite the top surface 29, and further includes a first wheel mounting flange 42 on which the first wheel 20 is rotatably mounted, and a second wheel mounting flange 42 on which the second wheel 20 is rotatably mounted. Each of the first wheel mounting flange 42 and the second wheel mounting flange 42 includes an outwardly extending threaded rod 40. Each of the first axial end 11 and the second axial end 13 of the frame 8 has an opening 44 formed through the top surface 29 and bottom surface 31 thereof. The rod 40 of the first wheel mounting flange 42 is received by the opening 44 formed in the first axial end 11 of the frame 8, and the rod 40 of the second wheel mounting flange 42 is received by the opening 44 formed in the second axial end 13 of the frame 8. Each rod 40 of the first wheel mounting flange 42 and the second wheel mounting flange 42 extends outwardly from the top surface 29 of the frame 8 to define a first extended rod portion 48 situated thereabove and extends outwardly from the bottom surface 31 of the frame 8 to define a second extended rod portion 33 situated therebelow an adjustable distance. The frame 8 further includes at least one adjustment nut 46 which is rotatably mounted on at least one of the first extended rod portion 48 and the second extended rod portion 29 of each rod 40 of the first wheel mounting flange 42 and the second wheel mounting flange 42. Rotation of the at least one adjustment nut 46 on the respective rod 40 on which it is mounted causes an adjustment of the distance which the second extended rod portion 33 extends outwardly from the bottom surface 31 of the frame 8.

Preferably, the at least one adjustment nut 46 may be rotatably mounted on the extended rod portion 33 of each of the rods 40 of the first wheel mounting flange 42 and the second wheel mounting flange 42 which extends outwardly from the bottom surface 31 of the frame 8. Thus, and as stated previously, rotation of the at least one adjustment nut 46 on the extended rod portion 33 of each of the rods 40 of the first wheel mounting flange 42 and the second wheel mounting flange 42 causes an adjustment of the distance which the second extended rod portion 33 extends outwardly from the bottom surface 31 of the frame 8 and an adjustment of the first distance and the second distance (each preferably measured from the wheel axle or bottom of the wheel) which the first wheel 6, 20 and the second wheel 6, 20 respectively extend outwardly from the bottom surface 31 of the frame 8.

The stability attachment 2 of the present invention may also be produced in a variety of colors to match or complement the colors of the personal transportation vehicles 4 on which the stability attachment 2 may be mounted.

It is very difficult or impossible for any beginner or untrained consumer to stand on the two-wheeled vehicle 4 with both feet without falling off and injuring himself, because the vehicle 4 will start to move immediately either in the forward or backward direction once its sensors detect the body weight of a person who stands on the vehicle 4 or detects a force or pressure loading on the vehicle. It is even quite difficult for any person to step on this kind of personal transportation vehicle 4 without any help from a second person or without holding onto a stationary object such as a wall in order to support himself before the person can step on the board with both feet.

By using the stability attachment 2 of the present invention, it will help prevent any injury to the user of such two-wheeled vehicles 4 and will help prevent the person from falling off the vehicle 4. The stability attachment 2 will also help to stabilize the two-wheeled vehicle 4 so that a user thereof will not need the help from a second person in order to step on the vehicle 4. The present invention will help make this kind of self-balancing vehicle 4 to be a safer product for all users at all ages.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A stability attachment for a personal transportation vehicle, the personal transportation vehicle having a main body forming a platform on which an operator stands, the main body having a first lateral end and a second lateral end disposed opposite the first lateral end and extending in a direction therebetween, the personal transportation vehicle further including a first drive wheel situated at the first lateral end of the main body and a second drive wheel situated at the second lateral end of the main body, the stability attachment comprising:

a frame having a first axial end and a second axial end disposed opposite the first axial end, the frame being selectively mountable on the main body of the personal transportation vehicle and extending outwardly therefrom and generally transversely thereto when mounted thereon;

at least a first wheel and a second wheel, the first wheel being situated on the frame in proximity to the first axial end thereof, and the second wheel being situated on the frame in proximity to the second axial end thereof, the first wheel and the second wheel being situated on diametrically opposite sides of the main body of the personal transportation vehicle when the stability attachment is mounted thereon; and means for attaching the frame to the personal transportation vehicle.

2. A stability attachment for a personal transportation vehicle as defined by claim 1, wherein the means for attaching the frame to the personal transportation vehicle comprises:

at least one clamp mechanism affixed to the frame and situated between the first axial end and the second axial end of the frame, the at least one clamp mechanism being engageable with a portion of the main body of the personal transportation vehicle to selectively mount the frame thereto.

3. A stability attachment for a personal transportation vehicle as defined by claim 2, wherein the clamp mechanism is formed as a band clamp, the band clamp having an adjustment mechanism and an attachment band extending therefrom, the attachment band having a free end that may be fitted over the main body of the personal transportation vehicle and engaged with the adjustment mechanism, the adjustment mechanism having at least one tightening screw that is selectively rotatable to advance and retract the free end of the attachment band through the adjustment mechanism; and wherein the selective rotation of the tightening screw adjusts the overall diameter of the attachment band to tighten or loosen the attachment band to the main body of the personal transportation vehicle when the stability attachment is mounted thereon.

4. A stability attachment for a personal transportation vehicle as defined by claim 3, wherein the band clamp is adjustable between about two inches in diameter and about five inches in diameter.

5. A stability attachment for a personal transportation vehicle as defined by claim 2, wherein the clamp mechanism further comprises:

a first mating segment and a second mating segment situated opposite the first mating segment, the first mating segment and the second mating segment being attachable to and being situatable on diametrically opposite sides of the main body of the personal transportation vehicle when the stability attachment is mounted thereon, each of the first mating segment and the second mating segment having a first end and a second end disposed opposite the first end;

wherein the first mating segment and the second mating segment are engageable with one another to define the clamp mechanism.

6. A stability attachment for a personal transportation vehicle as defined by claim 5, wherein the first mating segment and the second mating segment are formed as half ring segments, each half ring segment having a concave portion and first and second end flanges situated on opposite ends of the concave portion and respectively at the first and second ends of the first and second mating sections, the first and second mating sections, when joined together, defining between the concave portions an opening for receiving therein the portion of the main body of the personal transportation vehicle.

7. A stability attachment for a personal transportation vehicle as defined by claim 6, wherein each of the first and second end flanges of the first mating segment and each of the first and second end flanges of the second mating segment has an opening formed through the thickness thereof; and wherein the clamp mechanism further includes fasteners, the fasteners being receivable by the openings formed in the first and second end flanges of the first and second mating segments, the fasteners joining aligned first end flanges of the first mating segment and the second mating segment and aligned second end flanges of the first mating segment and the second mating segment.

8. A stability attachment for a personal transportation vehicle as defined by claim 7, wherein the clamp mechanism further comprises:

at least a first spacer and a second spacer, the first spacer being situated between the first end flanges of the first mating segment and the second mating segment, and the second spacer being situated between the second end flanges of the first mating segment and the second mating segment when the first mating segment and the second mating segment are joined together;

wherein the distance between the first mating segment and the second mating segment, when joined together, is selectively adjustable by inserting or removing the first spacer and the second spacer between the first end flanges and the second end flanges of the first mating segment and the second mating segment.

9. A stability attachment for a personal transportation vehicle as defined by claim 2, wherein the frame further comprises:

at least an elongated first support arm and an elongated second support arm extending in a substantially opposite direction to that of the first support arm;

wherein each of the first support arm and the second support arm has a first axial end and a second axial end situated opposite the first axial end;

wherein the second axial ends of the first support arm and the second support arm are connected to diametrically opposite sides of the clamp mechanism; and wherein the first wheel is situated on the first support arm in proximity to the first axial end thereof, and the second wheel is situated on the second support arm in proximity to the first axial end thereof.

10. A stability attachment for a personal transportation vehicle as defined by claim 9, wherein the clamp mechanism further includes a first side and a second side disposed opposite the first side, and a first attachment nut and a second attachment nut, the first attachment nut being mounted on the first side of the clamp mechanism, and the second attachment nut being mounted on the second side of the clamp mechanism, each of the first attachment nut and the second attachment nut having a threaded bore;

wherein the second axial ends of the first and second support arms include a threaded outer surface extending along at least a portion of the axial length thereof; and wherein the second axial end of the first support arm is threadingly engaged with the first attachment nut, and the second axial end of the second support arm is threadingly engaged with the second attachment nut.

11. A stability attachment for a personal transportation vehicle as defined by claim 9, wherein:

at least one of the first support arm and the second support arm includes at least a first telescoping member and a second telescoping member, the second telescoping member being at least partially receivable within the first telescoping member and being selectively extendable therefrom and retractable therein to adjust the overall length of the at least one of the first support arm and the second support arm.

12. A stability attachment for a personal transportation vehicle as defined by claim 11, wherein the overall length of the at least one of the first support arm and the second support arm is adjustable between about six inches and about twelve inches.

13. A stability attachment for a personal transportation vehicle as defined by claim 11, wherein at least one of the first telescoping member and the second telescoping member has at least one hole formed therein, and at least the other of the first telescoping member and the second telescoping member has a plurality of spaced apart holes formed therein and along at least a portion of the axial length thereof;
wherein the stability attachment further comprises a pin; and
wherein the overall length of the at least one of the first support arm and the second support arm is fixed by aligning the at least one hole of the first telescoping member with a respective hole of the second telescoping member and inserting the pin in the aligned holes.

14. A stability attachment for a personal transportation vehicle as defined by claim 11, wherein at least one of the first telescoping member and the second telescoping member of the at least one of the first support arm and the second support arm includes a threaded bore extending along at least a portion of the axial length thereof, and at least the other of the first telescoping member and the second telescoping member includes a threaded outer surface extending along at least a portion of the axial length thereof, the first telescoping member and the second telescoping member being in threading engagement with one another, wherein the overall length of the at least one of the first support arm and the second support arm is selectively adjustable by respectively rotating in a first direction and in a second direction which is opposite to the first direction one of the first telescoping member and the second telescoping member relative to the other of the first telescoping member and the second telescoping member.

15. A stability attachment for a personal transportation vehicle as defined by claim 1, wherein at least one of the first wheel and the second wheel is a rotatable caster wheel.

16. A stability attachment for a personal transportation vehicle as defined by claim 1, wherein the frame includes a bottom surface, and wherein the first wheel and the second wheel respectively extend outwardly from the bottom surface a first distance and a second distance; and
wherein the frame further includes:
means for independently adjusting the first distance and the second distance the first wheel and the second wheel respectively extend outwardly from the bottom surface of the frame.

17. A stability attachment for a personal transportation vehicle as defined by claim 16, wherein each of the first axial end and the second axial end of the frame has an opening formed therein; and
wherein the means for independently adjusting the first distance and the second distance includes:
at least a threaded first rod and a threaded second rod, the first wheel being operatively coupled to the first rod, and the second wheel being operatively coupled to the second rod, the first and second rods being respectively received by the openings formed in the first axial end and the second axial end of the frame; and
at least one adjustment nut threadingly mounted on each of the first rod and the second rod, the at least one adjustment nut being rotatable on each of the first rod and the second rod to respectively independently adjust the first distance and the second distance which the first wheel and the second wheel extend outwardly from the bottom surface of the frame.

18. A stability attachment for a personal transportation vehicle as defined by claim 1, wherein the frame has a top surface and a bottom surface disposed opposite the top surface;
wherein the frame further includes a first wheel mounting flange on which the first wheel is rotatably mounted, and a second wheel mounting flange on which the second wheel is rotatably mounted, each of the first wheel mounting flange and the second wheel mounting flange including an outwardly extending threaded rod;
wherein each of the first axial end and the second axial end of the frame has an opening formed through the top surface and bottom surface thereof;
wherein the rod of the first wheel mounting flange is received by the opening formed in the first axial end of the frame, and the rod of the second wheel mounting flange is received by the opening formed in the second axial end of the frame, each rod of the first wheel mounting flange and the second wheel mounting flange extending outwardly from the top surface of the frame to define a first extended rod portion situated thereabove and extending outwardly from the bottom surface of the frame to define a second extended rod portion situated therebelow an adjustable distance;
wherein the frame further includes at least one adjustment nut which is rotatably mounted on at least one of the first extended rod portion and the second extended rod portion of each rod of the first wheel mounting flange and the second wheel mounting flange, whereby rotation of the at least one adjustment nut on the respective rod on which it is mounted causes an adjustment of the distance which the second extended rod portion extends outwardly from the bottom surface of the frame.

19. A stability attachment for a personal transportation vehicle, the personal transportation vehicle having a main body forming a platform on which an operator stands, the main body having a first lateral end and a second lateral end disposed opposite the first lateral end and extending in a direction therebetween, the personal transportation vehicle further including a first drive wheel situated at the first lateral end of the main body and a second drive wheel situated at the second lateral end of the main body, the stability attachment comprising:
a frame having a first axial end and a second axial end disposed opposite the first axial end, the frame being selectively mountable on the main body of the personal transportation vehicle and extending outwardly therefrom and generally transversely thereto when mounted thereon; and
at least a first wheel and a second wheel, the first wheel being situated on the frame in proximity to the first axial end thereof, and the second wheel being situated on the frame in proximity to the second axial end thereof, the first wheel and the second wheel being situated on diametrically opposite sides of the main body of the personal transportation vehicle when the stability attachment is mounted thereon; and
means for attaching the frame to the personal transportation vehicle;
wherein the means for attaching the frame to the personal transportation vehicle includes at least one clamp mechanism affixed to the frame and situated between the first axial end and the second axial end of the frame, the at least one clamp mechanism being engageable with a portion of the main body of the personal transportation vehicle to selectively mount the frame thereto;

wherein the frame further includes at least an elongated first support arm and an elongated second support arm extending in a substantially opposite direction to that of the first support arm;

wherein each of the first support arm and the second support arm has a first axial end and a second axial end situated opposite the first axial end;

wherein the second axial ends of the first support arm and the second support arm are connected to diametrically opposite sides of the clamp mechanism;

wherein the first wheel is situated on the first support arm in proximity to the first axial end thereof, and the second wheel is situated on the second support arm in proximity to the first axial end thereof;

wherein at least one of the first support arm and the second support arm includes at least a first telescoping member and a second telescoping member, the second telescoping member being at least partially receivable within the first telescoping member and being selectively extendable therefrom and retractable therein to adjust the overall length of the at least one of the first support arm and the second support arm;

wherein at least one of the first telescoping member and the second telescoping member has at least one hole formed therein, and at least the other of the first telescoping member and the second telescoping member has a plurality of spaced apart holes formed therein and along at least a portion of the axial length thereof;

wherein the stability attachment further comprises a pin;

wherein the overall length of the at least one of the first support arm and the second support arm is fixed by aligning the hole in the first telescoping member with a respective hole of the plurality of holes of the second telescoping member and inserting the pin in the aligned holes;

wherein the frame includes a bottom surface, and wherein the first wheel and the second wheel respectively extend outwardly from the bottom surface a first distance and a second distance;

wherein the frame is structured to allow the independent adjustment of the first distance and the second distance the first wheel and the second wheel respectively extend outwardly from the bottom surface of the frame;

wherein the frame further includes a first wheel mounting flange on which the first wheel is rotatably mounted, and a second wheel mounting flange on which the second wheel is rotatably mounted, each of the first wheel mounting flange and the second wheel mounting flange including an outwardly extending rod;

wherein each of the first axial end and the second axial end of the frame has an opening formed in the bottom surface of the frame;

wherein the rod of the first wheel mounting flange is received by the opening formed in the first axial end of the frame, and the rod of the second wheel mounting flange is received by the opening formed in the second axial end of the frame, each rod of the first wheel mounting flange and the second wheel mounting flange extending outwardly from the bottom surface of the frame to define an extended rod portion situated therebelow, the extended rod portion of each rod being adjustable in the distance which the extended rod portion extends outwardly from the bottom surface of the frame so that the first distance and the second distance the first wheel and the second wheel respectively extend outwardly from the bottom surface of the frame are independently adjustable.

20. A stability attachment for a personal transportation vehicle as defined by claim 19, wherein at least one of the first telescoping member and the second telescoping member of the at least one of the first support arm and the second support arm includes a threaded bore extending along at least a portion of the axial length thereof, and at least the other of the first telescoping member and the second telescoping member includes a threaded outer surface extending along at least a portion of the axial length thereof, the first telescoping member and the second telescoping member being in threading engagement with one another, wherein the overall length of the at least one of the first support arm and the second support arm is selectively adjustable by respectively rotating in a first direction and in a second direction which is opposite to the first direction one of the first telescoping member and the second telescoping member relative to the other of the first telescoping member and the second telescoping member.

21. A stability attachment for a personal transportation vehicle as defined by claim 19, wherein each of the rod of the first wheel mounting flange and the rod of the second wheel mounting flange is threaded; and wherein the frame further includes at least one adjustment nut which is rotatably mounted on the extended rod portion of each of the rods of the first wheel mounting flange and the second wheel mounting flange which extends outwardly from the bottom surface of the frame, whereby rotation of the at least one adjustment nut on the extended rod portion of each of the rods of the first wheel mounting flange and the second wheel mounting flange causes an adjustment of the distance which the second extended rod portion extends outwardly from the bottom surface of the frame and an adjustment of the first distance and the second distance which the first wheel and the second wheel respectively extend outwardly from the bottom surface of the frame.

22. A device comprising in combination:

a personal transportation vehicle, the personal transportation vehicle having a main body forming a platform on which an operator stands, the main body having a first lateral end and a second lateral end disposed opposite the first lateral end and extending in a direction therebetween, the personal transportation vehicle further including a first drive wheel situated at the first lateral end of the main body and a second drive wheel situated at the second lateral end of the main body; and a stability attachment for mounting to the personal transportation vehicle, the stability attachment including:

a frame having a first axial end and a second axial end disposed opposite the first axial end, the frame being selectively mountable on the main body of the personal transportation vehicle and extending outwardly therefrom and generally transversely thereto when mounted thereon;

at least a first wheel and a second wheel, the first wheel being situated on the frame in proximity to the first axial end thereof, and the second wheel being situated on the frame in proximity to the second axial end thereof, the first wheel and the second wheel being situated on diametrically opposite sides of the main body of the personal transportation vehicle; and at least one clamp mechanism affixed to the frame and situated between the first axial end and the second axial end of the frame, the at least one clamp mechanism being engageable with a portion of the main body of the personal transportation vehicle to selectively mount the frame thereto.

* * * * *